United States Patent
Shen et al.

(10) Patent No.: US 12,512,916 B2
(45) Date of Patent: Dec. 30, 2025

(54) FAST CALIBRATION TEST SYSTEM AND METHOD FOR PHASED-ARRAY ANTENNA

(71) Applicant: BEIJING INSTITUTE OF SPACE LONG MARCH VEHICLE, Beijing (CN)

(72) Inventors: Bo Shen, Beijing (CN); Lei Li, Beijing (CN); Linka Tang, Beijing (CN); Xiaofei Wang, Beijing (CN); Weiyang Song, Beijing (CN); Jian Tu, Beijing (CN); Suixue Wang, Beijing (CN); Chao Dong, Beijing (CN); Rui Ma, Beijing (CN); Guodong Liu, Beijing (CN); Chao Yang, Beijing (CN); Feng Su, Beijing (CN); Yongsheng Cheng, Beijing (CN); Qiang Zhang, Beijing (CN); Xiaoning Huo, Beijing (CN); Yichang Gao, Beijing (CN); Wenwen Si, Beijing (CN); Longwei He, Beijing (CN); Weiwei Guan, Beijing (CN); Ji Li, Beijing (CN)

(73) Assignee: BEIJING INSTITUTE OF SPACE LONG MARCH VEHICLE, Beijing (CN)

( * ) Notice: Subject to any disclaimer, the term of this patent is extended or adjusted under 35 U.S.C. 154(b) by 222 days.

(21) Appl. No.: 18/292,855

(22) PCT Filed: Nov. 11, 2021

(86) PCT No.: PCT/CN2021/129959
§ 371 (c)(1),
(2) Date: Jan. 26, 2024

(87) PCT Pub. No.: WO2023/010707
PCT Pub. Date: Feb. 9, 2023

(65) Prior Publication Data
US 2024/0243818 A1    Jul. 18, 2024

(30) Foreign Application Priority Data

Aug. 6, 2021  (CN) .......................... 202110902101.8

(51) Int. Cl.
    H04B 17/00    (2015.01)
    H04B 17/12    (2015.01)
    H04B 17/13    (2015.01)
(52) U.S. Cl.
    CPC ......... H04B 17/12 (2015.01); H04B 17/0085 (2013.01); H04B 17/13 (2015.01)
(58) Field of Classification Search
    None
    See application file for complete search history.

(56) References Cited

U.S. PATENT DOCUMENTS

| 11,546,040 B2 * | 1/2023 | Nayak ................. H04B 17/309 |
| 2021/0048500 A1 * | 2/2021 | Manolakos ........... G01S 5/0054 |

(Continued)

FOREIGN PATENT DOCUMENTS

| CN | 107064887 A | 8/2017 |
| CN | 107703494 A | 2/2018 |

(Continued)

OTHER PUBLICATIONS

International Search Report and Written Opinion received for PCT Serial No. PCT/CN2021/129959 on May 9, 2022, 11 pgs.

(Continued)

*Primary Examiner* — Wilson Lee
(74) *Attorney, Agent, or Firm* — Merchant & Gould P.C.

(57) ABSTRACT

A fast calibration test system and method for a phased-array antenna, which belongs to the technical field of antenna measurement, relates to a near-field test system, and relates in particular to the fast calibration and a directional diagram test on a phased-array antenna. The system comprises an upper computer module, a switch module, a synchronization (Continued)

control module, a signal source module, a power amplifier module, a low noise amplifier module, a phased array antenna to be tested, a power supply module, a calibration control module, a scanning module, a signal conditioning module and a vector network module; on the basis of a pulse synchronization mechanism, the loading delay of a wave control code is shortened by using real-time calculation method; the channel calibration of the phased-array antenna under various frequencies may be completed by means of two rounds of scanning, and a directional diagram test on the phased-array antenna under a combination of various frequencies and directional angles may be covered by means of one round of scanning.

12 Claims, 9 Drawing Sheets

(56) References Cited

U.S. PATENT DOCUMENTS

| | | | |
|---|---|---|---|
| 2022/0279535 A1* | 9/2022 | Tsui | H04B 7/0695 |
| 2022/0322267 A1* | 10/2022 | Bao | G01S 5/0036 |
| 2024/0007155 A1* | 1/2024 | Åström | H04B 7/0617 |

FOREIGN PATENT DOCUMENTS

| | | |
|---|---|---|
| CN | 207281181 U | 4/2018 |
| CN | 107991541 A | 5/2018 |
| KR | 101052045 B1 | 7/2011 |

OTHER PUBLICATIONS

Qiao, Xingwang, et al., "Design of a Phased Array Antenna Automatic Test System", Electronic Technology & Sotware Engineering, No. 12, Jun. 15, 2021, ISSN: 2095-5650, 3 pgs.

Bing, Li, et al., "Research and Implementation of Phased Array Antenna Automatic Test", Beijing Research Institute of Telemetry, Jul. 11, 2017, 5 pgs.

\* cited by examiner

FAST CALIBRATION TEST SYSTEM AND METHOD FOR PHASED-ARRAY ANTENNA

CROSS-REFERENCE TO RELATED APPLICATIONS

This application is a National Stage Application of PCT/CN2021/129959, filed Nov. 11, 2021, which claims priority to Chinese Patent Application No. 202110902101.8, filed on Aug. 6, 2021, and which applications are incorporated herein by reference. To the extent appropriate, a claim of priority is made to each of the above-disclosed applications.

TECHNICAL FIELD

The present disclosure relates to a system and a method for rapidly calibrating and measuring a phased-array antenna, belonging to the technical field of antenna measurement. The present disclosure relates to a near-field measurement system, and in particular to rapid calibration of a phased-array antenna and measurement of a radiation pattern of the phased-array antenna.

BACKGROUND

Phased-array antennas have significant advantages in rapid pointing, shape agility, spatial power synthesis, and spatial filtering due to the feature of beam agility. With the development of integrated circuits and micro assembly processes, the size and cost of the phased array antennas are continuously reduced, and the phased-array antennas are increasingly widely used in the radar field, the communication field, and the like.

A phased-array antenna includes an antenna array, a T/R component, a power division feed network, and a heat conducting structure. Due to differences in consistencies of indexes of channels of the T/R component and errors generated in processing and assembling sub-modules, initial amplitudes and phases of the channels of the phased-array antenna are inconsistent and change with frequency. To ensure the normal operation of the phased-array antenna and suppress the effects of antenna gain reduction and sidelobe rise caused by the initial amplitude differences and phase differences, it is required to calibrate the amplitude and the phase of the phased-array antenna by using a near-field measurement environment, and calculate a far-field radiation pattern based on a near-field radiation feature.

The process of calibrating an amplitude and a phase of a phased-array antenna and the process of measuring a radiation pattern of a phased-array antenna are much more complex than the process of measuring a radiation pattern of a unit antenna, and thus it generally requires a long period of time. At present, the cost of renting a near-field measurement darkroom is generally 20000 RMB to 40000 RMB per day. The cost of the calibration and measurement of the phased-array antenna is directly determined by the time spent on the calibration and measurement, especially for a low-cost and small-scale phased-array antenna. How to simplify the calibration and measurement of the phased-array antenna and improve the measurement efficiency is crucial for large-scale application of phased-array antennas in the field of national defense.

According to Li Bing et al: "Research and Implementation of Phased Array Antenna Automatic Test" (Aerospace Manufacturing Technology, 2017, 10(5): 59-63), an automatic measurement system based on an Ethernet is disclosed. An upper computer pre-stores a beam-control code for operation of a phased-array antenna in a flash, the phased-array antenna reads the beam-control code based on a parallel control code from a scanning frame, and multiple radiation patterns may be continuously measured. According the method, the automation of measuring the phased-array antenna can be significantly improved. However, there is still room for further improvement. To ensure the accuracy of the measurement, a moving speed of a scanning probe is limited (ranging from 40 mm/s to 80 mm/s), which is an inherent limiting factor on measurement efficiency. According to the automatic measurement system proposed by Li Bing, the probe can only measure a combination of a frequency and a pointing angle in one round of scanning. If multiple combinations of frequencies and pointing angles are measured in one round of scanning, the efficiency of calibration and measurement can be significantly improved.

SUMMARY

In order to solve the technical problems in the conventional technology, a system and a method for rapidly calibrating and measuring a phased-array antenna are provided according to the present disclosure, in which a measurement process is optimized and operation delays of some modules are reduced, thereby significantly improving the efficiency of calibrating the amplitude and phase and measuring a radiation pattern of the phased-array antenna.

The following solutions are provided according to the preset disclosure.

A system for rapidly calibrating and measuring a phased-array antenna includes: an upper computer module, a switch module, a synchronization control module, a signal source module, a power amplifier module, a low-noise amplifier module, a to-be-measured phased-array antenna, a power supply module, a calibration control module, a scanning module, a signal conditioning module, and a vector network module.

The upper computer module is configured to: transmit configuration information to the calibration control module via an RS422 interface and receive state information from the calibration control module via the RS422 interface; and transmit the configuration information to the switch module via an Ethernet interface and receive position information of a scanning probe and acquired data from the switch module.

The switch module is configured to: receive the configuration information from the upper computer module via the Ethernet interface, and transmit the configuration information to each of the signal source module, the synchronization control module, the scanning module, the signal conditioning module, and the vector network module via a different Ethernet interfaces based on different destination addresses; and receive the position information of the scanning probe from the scanning module via the Ethernet interface, receive acquired data from the vector network module via the Ethernet interface, and transmit the position information and the acquired data to the upper computer module via the Ethernet interface.

The synchronization control module is configured to: receive the configuration information from the switch module via the Ethernet interface, generate a pulse synchronization signal, and transmit the pulse synchronization signal to the signal source module, the calibration control module, and the vector network module via a GPIO interface.

The signal source module is configured to: in a transmission measurement state, receive the configuration information from the switch module via the Ethernet interface, receive the pulse synchronization signal from the synchronization control module via the GPIO interface, and generate a radio frequency reference signal and transmit the radio frequency reference signal to the power amplifier module via a radio frequency coaxial interface; and in a reception measurement state, receive the configuration information from the switch module via the Ethernet interface, receive the pulse synchronization signal from the synchronization control module via the GPIO interface, and generate a radio frequency reference signal and transmit the radio frequency reference signal to the scanning module and the signal conditioning module via a radio frequency coaxial interface.

The power amplifier module is configured to: in the transmission measurement state, receive the radio frequency reference signal from the signal source module via the radio frequency coaxial interface, generate an amplified signal, and transmit the amplified signal to the to-be-measured phased-array antenna and the signal conditioning module via the radio frequency coaxial interface.

The power supply module is configured to: supply a 28V power to the calibration control module via a power supply interface.

The calibration control module is configured to: receive the 28V power from the power supply module via the power supply interface, convert the 28V power to a +5V power and a −5V power, output the +5V power and the −5V power to the to-be-measured phased-array antenna via the power supply interface, receive the configuration information from the upper computer module via the RS422 interface, receive the pulse synchronization signal from the synchronization control module via the GPIO interface, generate a beam-control code after parsing the pulse synchronization signal, transmit the beam-control code to the to-be-measured phased-array antenna via the GPIO interface, and transmit the state information to the upper computer module via the RS422 interface.

The to-be-measured phased-array antenna is configured to: in the transmission measurement state, receive the amplified signal from the power amplifier module via the radio frequency coaxial interface, receive the beam-control code from the calibration control module via the GPIO interface, generate a radio frequency transmission signal, and transmit the radio frequency transmission signal to the scanning module through electromagnetic wave radiation; and in the reception measurement state, receive a radio frequency transmission signal from the scanning module through electromagnetic wave radiation, receive the beam-control code from the calibration control module via the GPIO interface, generate a radio frequency reception signal, and transmit the radio frequency reception signal to the low-noise amplifier module via the radio frequency coaxial interface.

The low-noise amplifier module is configured to: in the reception measurement state, receive the radio frequency reception signal from the to-be-measured phased-array antenna via the radio frequency coaxial interface, perform amplification and filtering on the radio frequency reception signal to generate an amplified signal, and transmit the amplified signal to the signal conditioning module via the radio frequency coaxial interface;

The scanning module is configured to: receive the configuration information from the switch module via the Ethernet interface, move the scanning probe, and transmit the position information of the scanning probe to the switch module via the Ethernet interface; in the transmission measurement state, receive the radio frequency transmission signal from the to-be-measured phased-array antenna through electromagnetic wave radiation, generate a radio frequency reception signal, and transmit the radio frequency reception signal to the signal conditioning module via the radio frequency coaxial interface; and in the reception measurement state, receive the radio frequency reference signal from the signal source module via the radio frequency coaxial interface, generate the radio frequency transmission signal, and transmit the radio frequency transmission signal to the to-be-measured phased-array antenna through electromagnetic wave radiation.

The signal conditioning module is configured to: in the transmission measurement state, receive the configuration information from the switch module via the Ethernet interface, receive the radio frequency reception signal from the scanning module and the amplified signal from the power amplifier module via the radio frequency coaxial interface, perform down conversion processing on the radio frequency reception signal and the amplified signal to generate a baseband reception signal and a baseband reference signal, and transmit the baseband reception signal and the baseband reference signal to the vector network module via the radio frequency coaxial interface; and in the reception measurement state, receive the configuration information from the switch module via the Ethernet interface, receive the amplified signal from the low-noise amplifier module and the radio frequency reference signal from the signal source module via the radio frequency coaxial interface, perform down conversion processing on the amplified signal and the radio frequency reference signal to generate a baseband reception signal and a baseband reference signal, and transmit the baseband reception signal and the baseband reference signal to the vector network module via the radio frequency coaxial interface.

The vector network module is configured to: receive the configuration information from the switch module via the Ethernet interface, receive the pulse synchronization signal from the synchronization control module via the GPIO interface, receive the baseband reception signal and the baseband reference signal from the signal conditioning module via the radio frequency coaxial interface, calculate an amplitude ratio and a phase difference between the baseband reception signal and the baseband reference signal, and transmit the amplitude ratio and the phase difference to the switch module via the Ethernet interface.

In an embodiment, the calibration control module includes: a calibration data loader, a pointing angle generator, an amplitude code calculator, a phase code calculator, and a beam-control code generator.

The calibration data loader includes five dual-port RAMs for storing a frequency sequence number list, amplitude calibration data and phase calibration data in the transmission measurement state, and amplitude calibration data and phase calibration data in the reception measurement state; there is a correspondence relationship between RAM addresses of calibration data and frequency sequence numbers; the calibration data loader is configured to, in a case that a valid pulse flag is equal to 1, read calibration data from an address corresponding to a current frequency sequence number, transmit the calibration data to the amplitude code calculator, the phase code calculator, and the beam-control code generator, and read a next frequency sequence number; and in a case that a valid pulse flag after being accumulated M times is equal to 1, an RAM address of an RAM for storing the frequency sequence number list is set to zero.

The pointing angle generator is configured to: generate all combinations of an azimuth angle and a pitch angle based on a pointing angle range, where the pointing angle range includes an initial value, an increment value and the number of the azimuth angle, and an initial value, an increment value and the number of the pitch angle; accumulate the initial value of the azimuth angle and accumulate the initial value of the pitch angle; store accumulated results in an RAM; in a case that a valid frequency flag after being accumulated M times is equal to 1, read a next azimuth angle; in a case that a valid frequency flag after being accumulated $M*N_{AZ}$ times is equal to 1, read a next pitch angle; and in a case that a valid frequency flag after being accumulated $M*N_{AZ}*N_{EL}$ times is equal to 1, set the azimuth angle as the initial value and set the pitch angle as the initial value.

The amplitude code calculator is configured to add amplitude weighted data of each of channels prestored in an ROM to the amplitude calibration data to obtain a result, and determine highest 6 bits of the result as an amplitude code.

The phase code calculator is configured to calculate a phase code based on the phase calibration data, the azimuth angle, the pitch angle, and the frequency sequence numbers.

The beam-control code generator is configured to: perform channel feature measurement, channel calibration measurement, and radiation pattern measurement. The beam-control code generator is configured to, in a case of performing the channel feature measurement, generate a beam-control code for turning on or turning off a channel, wherein the amplitude code and the phase code are set to zero; in a case of performing the channel calibration measurement, load amplitude calibration data and phase calibration data corresponding to a frequency, and generate a beam-control code with a calibration parameter and for turning on or turning off a channel; and in a case of performing the radiation pattern measurement, load an amplitude code and a phase code corresponding to a combination of a frequency and a pointing angle, and generate a beam-control code for turning on a array.

In an embodiment, the phase code is calculated by using the following equation:

$$C(i,j) = \text{round}\left\{\frac{\text{mod}\{[\delta_{i,j}-(i-1)\alpha-(j-1)\beta], 2\pi\}}{2\pi/2^m}\right\}$$

where i and j respectively represent a row number and a column number of a channel of the to-be-measured phased-array antenna, C(i,j) represents a phase code of a channel at an i-th row and a j-th column, round { } represents a rounding operation, $\delta_{i,j}$ represents phase calibration data at the i-th row and the j-th column, m represents the number of bits of a phase shifter of a T/R component, a represents a phase difference of a channel in a azimuth direction and β represents a phase difference of the channel in a pitch direction, and a and β are expressed as:

$$\alpha = kd\sin\alpha_s$$
$$\beta = kd\cos\alpha_s\sin\varepsilon_s$$

where $k=2\pi/\lambda$, λ a represents a wavelength at an operation frequency, d represents a channel interval of the to-be-measured phased-array antenna, as represents the azimuth angle, and es represents the pitch angle.

In an embodiment, the phase code calculator is configured to: perform sine and cosine operations by using a CORDIC core, convert a fixed-point data type to a floating-point data type, store $2\pi d/\lambda$ corresponding to each of frequencies in the ROM in the floating-point data type; read data from the ROM based on a frequency sequence number and multiply the data with a result of the sine and cosine operations to obtain a product; and convert the product into a fixed-point data type, accumulate the product in the fixed-point data type to obtain a result, and determine highest 6 bits of the result as the phase code of the channel.

A method for rapidly calibrating and measuring a phased-array antenna, applied to the system for rapidly calibrating and measuring a phased-array antenna, is provided. The method includes:

step 1, setting, by the upper computer module, operation parameters of the synchronization control module, the signal source module, the scanning module, the calibration control module, the signal conditioning module, and the vector network module, and generating, by the upper computer module, a to-be-measured frequency list;

step 2, measuring amplitude and phase features of channels of the phased-array antenna at multiple frequencies, and obtaining channel calibration data;

step 3, loading, by the upper computer module, the frequency list and the channel calibration data to the phased-array antenna;

step 4, measuring amplitude and phase features of the channels after being calibrated of the phased-array antenna at the multiple frequencies, and obtaining a calibration result of the amplitude and phase features of the channels after being calibrated of the phased-array antenna at the multiple frequencies;

step 5, verifying the calibration result of the amplitude and phase features of the channels after being calibrated of the phased-array antenna at the multiple frequencies; proceeding to step 6 in a case that the calibration result meets an expected requirement; and proceeding to step 3 in a case that the calibration result does not meet an expected requirement;

step 6, loading by the upper computer module, the frequency list and a pointing angle range to the phased-array antenna;

step 7, measuring a near-field radiation feature of the phased-array antenna at combinations of the frequencies and pointing angles; and step 8, calculating a far-field radiation pattern based on the near-field radiation feature, and evaluating indexes of the to-be-measured phased-array antenna based on the far-field radiation pattern.

In an embodiment, the step 2 further includes:

controlling, by the upper computer module, the scanning module to sequentially align the scanning probe with a geometric center of each of the channels of the to-be-measured phased-array antenna;

after the scanning probe is aligned with a geometric center of a channel, controlling, by the upper computer module, the calibration control module to only activate the channel of the to-be-measured phased-array antenna, and setting, by the upper computer module, an attenuation value and a phase shift value to zero;

changing, by the signal source module after receiving a pulse synchronization signal from the synchronization control module, a frequency of the radio frequency reference signal; and acquiring, by the vector network module after receiving a pulse synchronization signal from the synchronization control module, data, and transmitting, by the vector network module, the acquired data to the upper computer module.

In an embodiment, the step 3 further includes: generating, by the upper computer module, a channel calibration data table based on the amplitude and phase features of the channels of the phased-array antenna at the multiple frequencies, loading, by the upper computer module, the channel calibration data table to the calibration control module, and loading, by the upper computer module, the frequency list to the signal source module and the calibration control module.

In an embodiment, the step 4 further includes:
controlling, by the upper computer module, the scanning module to sequentially align the scanning probe with a geometric center of each of the channels of the to-be-measured phased-array antenna;
after the scanning probe is aligned with a geometric center of a channel, controlling, by the upper computer module, the calibration control module to only activate the channel of the to-be-measured phased-array antenna;
changing, by the calibration control module after receiving a pulse synchronization signal from the synchronization control module, an operation frequency, converting, by the calibration control module, channel calibration data corresponding to the operation frequency to a beam-control code, and transmitting, by the calibration control module, the beam-control code to the to-be-measured phased-array antenna;
changing, by the signal source module after receiving a pulse synchronization signal from the synchronization control module, a frequency of the radio frequency reference signal; and
acquiring, by the vector network module after receiving a pulse synchronization signal from the synchronization control module, data, and transmitting, by the vector network module, the acquired data to the upper computer module.

In an embodiment, the step 7 further includes:
changing, by the calibration control module after receiving a pulse synchronization signal from the synchronization control module, an operation frequency; changing, by the calibration control module, after receiving M pulse synchronization signals from the synchronization control module, the pointing angle, and setting, by the calibration control module, the operation frequency to an initial value; and setting, by the calibration control module after receiving M*N pulse synchronization signals from the synchronization control module, the operation frequency to an initial value, and setting, by the calibration control module, the pointing angle to an initial value; where M represents the number of the frequencies, and N represents the number of the pointing angles;
calculating, by the calibration control module, the beam-control code in real time based on the operation frequency, the pointing angle, and the channel calibration data, and transmitting, by the calibration control module, the beam-control code to the to-be-measured phased-array antenna; changing, by the signal source module after receiving a pulse synchronization signal from the synchronization control module, a frequency of the radio frequency reference signal; and acquiring, by the vector network module after receiving a pulse synchronization signal from the synchronization control module, data, and transmitting, by the vector network module, the acquired data to the upper computer module; and
controlling, by the upper computer module, the scanning module to move the scanning probe along a predetermined trajectory until the measurement is completed.

In an embodiment, the step 8 further includes: dividing, by the upper computer module, the acquired data into M*N groups based on the frequencies and the pointing angles, calculating by the upper computer module, the far-field radiation pattern of the to-be-measured phased-array antenna at different combinations of the frequencies and the pointing angles, and evaluating by the upper computer module, the indexes of the to-be-measured phased-array antenna, where M represents the number of the frequencies and N represents the number of the pointing angles.

Compared with the conventional technology, the present disclosure has the following advantages.

A near-field measurement system for rapidly calibrating a phased-array antenna and measuring a radiation pattern is provided according to the present disclosure. According to the system, a loading delay of the beam-control code is reduced by performing real-time calculation based on pulse synchronization, two rounds of scanning are performed to realize channel calibration on the phased-array antenna at multiple frequencies, and one round of scanning is performed to measure the radiation pattern of the phased-array antenna at combinations of frequencies and pointing angles. A 8*8 phased-array antenna with a center frequency $f_0$ of 12 GHz and a bandwidth BW of 2 GHz is used as a measurement object, the number M of operation frequencies is set to 5, the number $N_{AZ}$ of azimuth angles is set to 25, the number $N_{EL}$ of pitch angles is set to 10, a time period $T_{CLB}$ for performing one round of scanning is set to 10 min, and a time period $T_{PAT}$ for performing one round of radiation pattern measurement is set to 20 min. In the measurement system proposed by Li Bing et al., a total time period $T_{A0}$ for performing transmission measurement or performing reception measurement is calculated by using the following equation:

$$T_{A0} = T_{CLB} + M * T_{CLB} + M * N_{AZ} * N_{EL} * T_{PAT} = 25060 \text{ min}$$

With the measurement system according to the present disclosure, a total time period $T_{A1}$ performing transmission measurement or performing reception measurement is calculated by using the following equation:

$$T_{A1} = T_{CLB} + T_{CLB} + T_{PAT} = 40 \text{ min}$$

From the above analysis, it can be seen that according to the present disclosure, the efficiency of calibrating amplitude and phase and measuring radiation pattern of the phased-array antenna can be improved by 625 times. Considering the installation, transmission measurement, reception measurement, data processing, and analysis time of the phased-array antenna, the time period in which a single phased-array antenna is measured is about 3 hours. Assuming that the rent fee for a darkroom is 20000 CNY per day (12 hours) and the measurement fee is 5000 CNY/unit, the measurement cost is significantly reduced.

DETAILED DESCRIPTION

In order to better understand the above technical solutions, the technical solutions of the present disclosure are described in detail below in conjunction with the drawings and specific embodiments. It should be understood that features of the embodiments and the embodiments of the present disclosure are intended to illustrate in detail the technical solutions of the present disclosure, rather than to limit the technical solutions of the present disclosure. Without conflict, the embodiments of the present disclosure and the technical features in the embodiments may be combined with each other.

Hereinafter, a system and a method for rapidly calibrating and measuring a phased-array antenna according to embodiments of the present disclosure are further described in detail in conjunction with the drawings in the specification. The specific implementations are described below (as shown in FIGS. 1 to 9). The system for rapidly calibrating and measuring a phased-array antenna may operate in a transmission measurement state and a reception measurement state. The system may operate in a transmission measurement state or a reception measurement state. In the transmission measurement state, the system calibrates a transmission channel of a to-be-measured phased-array antenna, and measures a transmission radiation pattern. In the reception measurement state, the system calibrates a reception channel of a to-be-measured phased-array antenna, and measures a reception radiation pattern.

System structure and operations performed in the transmission measurement state

Figure 1:
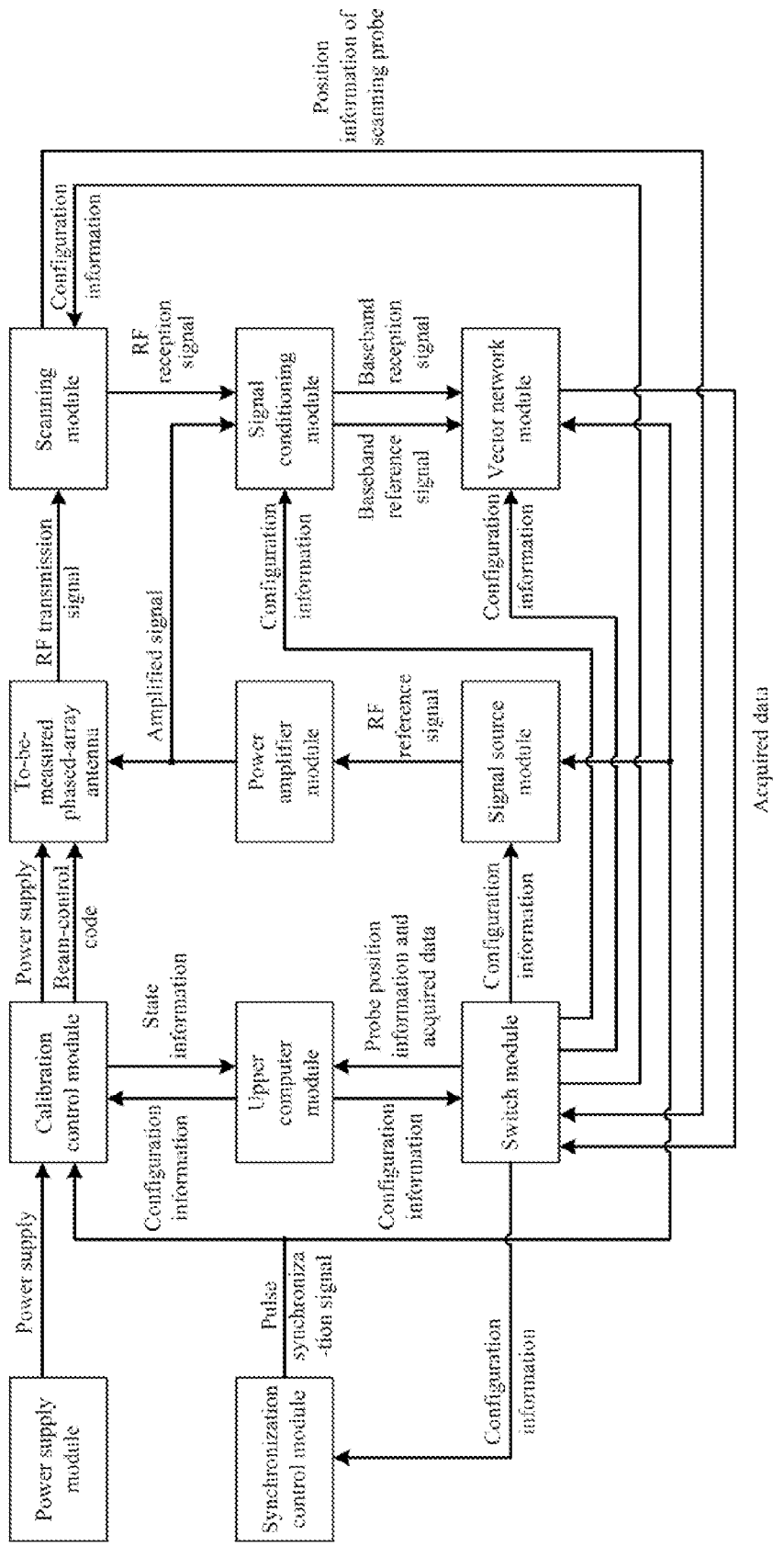
FIG. 1 is a schematic diagram showing connections of a system in a transmission measurement state.

In the transmission measurement state, the system for rapidly calibrating and measuring a phased-array antenna includes: an upper computer module, a switch module, a synchronization control module, a signal source module, a power amplifier module, a to-be-measured phased-array antenna, a power supply module, a calibration control module, a scanning module, a signal conditioning module, and a vector network module, as shown in FIG. 1.

The upper computer module transmits configuration information to the calibration control module via an RS422 interface, and receives state information from the calibration control module. The upper computer module transmits the configuration information to the switch module via an Ethernet interface, and receives position information of a scanning probe and acquired data from the switch module.

The switch module receives the configuration information from the upper computer module via the Ethernet interface, and transmits the configuration information to each of the signal source module, the synchronization control module, the scanning module, the signal conditioning module, and the vector network module via a different Ethernet interface based on different destination addresses. The switch module receives the position information of the scanning probe from the scanning module via the Ethernet interface, receives acquired data from the vector network module via the Ethernet interface, and transmits the position information and the acquired data to the upper computer module via the Ethernet interface.

The synchronization control module receives the configuration information from the switch module via the Ethernet interface, generates a pulse synchronization signal, and transmits the pulse synchronization signal to the signal source module, the calibration control module, and the vector network module via a GPIO interface.

The signal source module receives the configuration information from the switch module via the Ethernet interface, and receives the pulse synchronization signal from the synchronization control module via the GPIO interface. The signal source module generates a radio frequency reference signal and transmits the radio frequency reference signal to the power amplifier module via a radio frequency coaxial interface.

The power amplifier module receives the radio frequency reference signal from the signal source module via the radio frequency coaxial interface, generates an amplified signal, and transmits the amplified signal to the to-be-measured phased-array antenna and the signal conditioning module via the radio frequency coaxial interface.

The power supply module supplies a 28V power to the calibration control module via a power supply interface.

The calibration control module receives the 28V power from the power supply module via the power supply interface, converts the 28V power to a 5V power and a −5V power, and outputs the 5V power and the −5V power to the to-be-measured phased-array antenna via the power supply interface. The calibration control module receives the configuration information from the upper computer module via the RS422 interface, receives the pulse synchronization signal from the synchronization control module via the GPIO interface, generates a beam-control code after parsing the pulse synchronization signal, and transmits the beam-control code to the to-be-measured phased-array antenna via the GPIO interface.

The to-be-measured phased-array antenna receives the amplified signal from the power amplifier module via the radio frequency coaxial interface, receives the beam-control code from the calibration control module via the GPIO interface, generates a radio frequency transmission signal, and transmits the radio frequency transmission signal to the scanning module through electromagnetic wave radiation.

The scanning module receives the configuration information from the switch module via the Ethernet interface, moves the scanning probe, and transmits the position information of the scanning probe to the switch module via the Ethernet interface. The scanning module receives the radio frequency transmission signal from the to-be-measured phased-array antenna through electromagnetic wave radiation, generates a radio frequency reception signal, and transmits the radio frequency reception signal to the signal conditioning module via the radio frequency coaxial interface.

The signal conditioning module receives the configuration information from the switch module via the Ethernet interface, receives the radio frequency reception signal from the scanning module and the amplified signal from the power amplifier module via the radio frequency coaxial interface, performs down conversion processing on the radio frequency reception signal and the amplified signal to generate a baseband reception signal and a baseband reference signal, and transmits the baseband reception signal and the baseband reference signal to the vector network module via the radio frequency coaxial interface.

The vector network module receives the configuration information from the switch module via the Ethernet interface, receives the pulse synchronization signal from the synchronization control module via the GPIO interface, receives the baseband reception signal and the baseband reference signal from the signal conditioning module via the radio frequency coaxial interface, calculates an amplitude ratio and a phase difference (which are the acquired data) between the baseband reception signal and the baseband reference signal, and transmits the amplitude ratio and the phase difference to the switch module via the Ethernet interface.

System structure and operations performed in the reception measurement state

Figure 2:
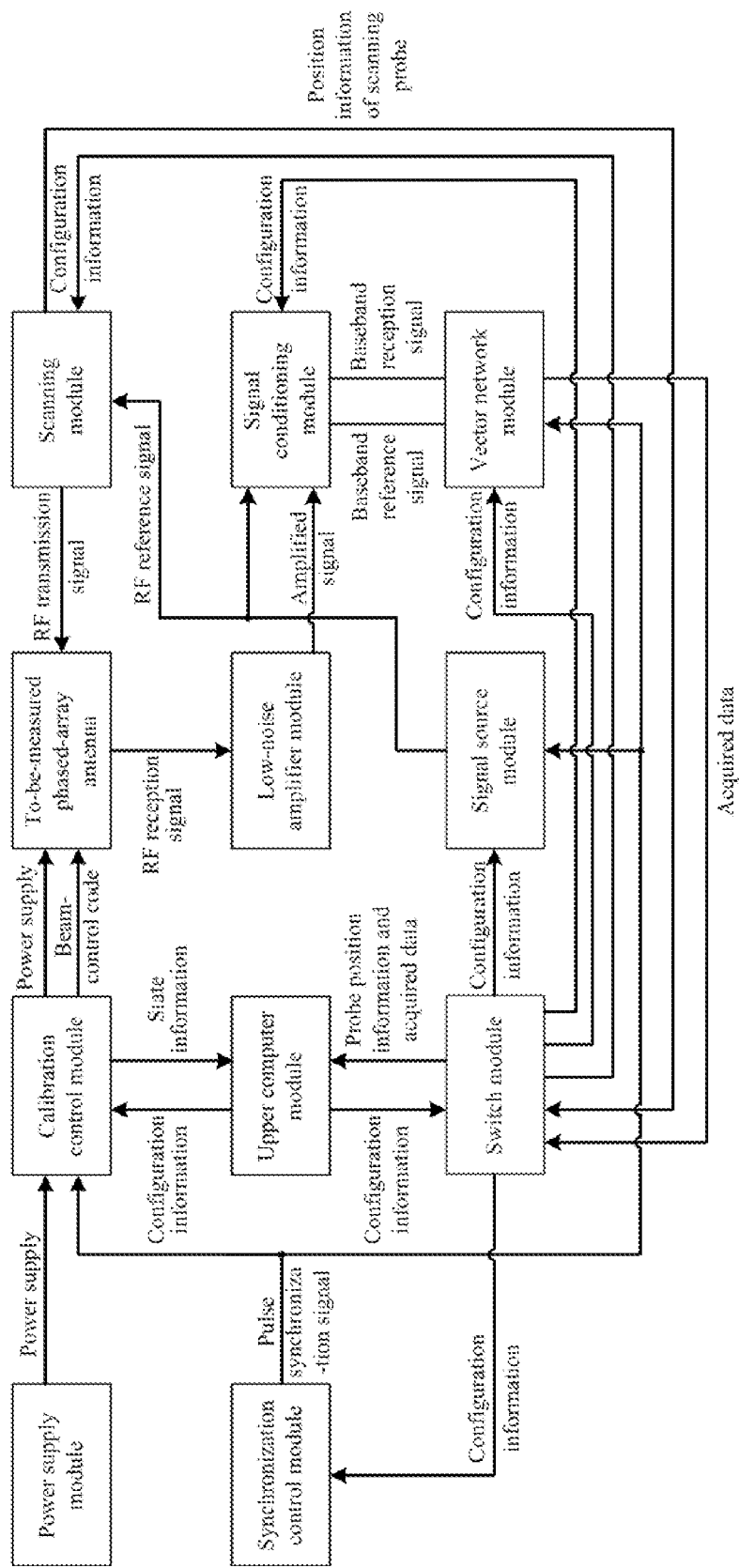
FIG. 2 is a schematic diagram showing connections of a system in a reception measurement state.

In the reception measurement state, the system for rapidly calibrating and measuring a phased-array antenna includes: an upper computer module, a switch module, a synchronization control module, a signal source module, a scanning module, a power supply module, a calibration control module, a to-be-measured phased-array antenna, a low-noise amplifier module, a signal conditioning module, and a vector network module, as shown in FIG. 2.

The upper computer module transmits configuration information to the calibration control module via an RS422 interface, and receives state information from the calibration control module via the RS422 interface. The upper computer module transmits the configuration information to the switch module via an Ethernet interface, and receives position information of the scanning probe and acquired data from the switch module.

The switch module receives the configuration information from the upper computer module via the Ethernet interface, and transmits the configuration information to each of the signal source module, the synchronization control module, the scanning module, the signal conditioning module, and the vector network module via a different Ethernet interface based on different destination addresses. The switch module receives the position information of the scanning probe from the scanning module via the Ethernet interface, receives acquired data from the vector network module via the Ethernet interface, and transmits the position information and the acquired data to the upper computer module via the Ethernet interface.

The synchronization control module receives the configuration information from the switch module via the Ethernet interface, generates a pulse synchronization signal, and transmits the pulse synchronization signal to the signal source module, the calibration control module, and the vector network module via the GPIO interface.

The signal source module receives the configuration information from the switch module via the Ethernet interface, and receives the pulse synchronization signal from the synchronization control module via the GPIO interface. The signal source module generates a radio frequency reference signal and transmits the radio frequency reference signal to the scanning module and the signal conditioning module via the radio frequency coaxial interface.

The scanning module receives the configuration information from the switch module via the Ethernet interface, moves the scanning probe, and transmits the position information of the scanning probe to the switch module via the Ethernet interface. The scanning module receives the radio frequency reference signal from the signal source module via the radio frequency coaxial interface, generates a radio frequency transmission signal, and transmits the radio frequency transmission signal to the to-be-measured phased-array antenna through electromagnetic wave radiation.

The power supply module supplies a 28V power to the calibration control module via a power supply interface.

The calibration control module receives the 28V power from the power supply module via the power supply interface, converts the 28V power to a +5V power and a -5V power, and outputs the +5V power and the -5V power to the to-be-measured phased-array antenna via the power supply interface. The calibration control module receives the configuration information from the upper computer module via the RS422 interface, receives the pulse synchronization signal from the synchronization control module via the GPIO interface, generates a beam-control code after parsing the pulse synchronization signal, and transmits the beam-control code to the to-be-measured phased-array antenna via the GPIO interface. The calibration control module transmits the state information to the upper computer module via the RS422 interface.

The to-be-measured phased-array antenna receives the radio frequency transmission signal from the scanning module through electromagnetic wave radiation, receives the beam-control code from the calibration control module via the GPIO interface, generates a radio frequency reception signal, and transmits the radio frequency reception signal to the low-noise amplifier module via the radio frequency coaxial interface.

The low-noise amplifier module receives the radio frequency reception signal from the to-be-measured phased-array antenna via the radio frequency coaxial interface, performs amplification and filtering on the radio frequency reception signal to generate an amplified signal, and transmits the amplified signal to the signal conditioning module via the radio frequency coaxial interface.

The signal conditioning module receives the configuration information from the switch module via the Ethernet interface, receives the amplified signal from the low-noise amplifier module and the radio frequency reference signal from the signal source module via the radio frequency coaxial interface, performs down conversion processing on the amplified signal and the radio frequency reference signal to generate a baseband reception signal and a baseband reference signal, and transmits the baseband reception signal and the baseband reference signal to the vector network module via the radio frequency coaxial interface.

The vector network module receives the configuration information from the switch module via the Ethernet interface, receives the pulse synchronization signal from the synchronization control module via the GPIO interface, receives the baseband reception signal and the baseband reference signal from the signal conditioning module via the radio frequency coaxial interface, calculates an amplitude ratio and a phase difference (which are the acquired data) between the baseband reception signal and the baseband reference signal, and transmits the amplitude ratio and the phase difference to the switch module via the Ethernet interface.

Measurement Process

Figure 3:
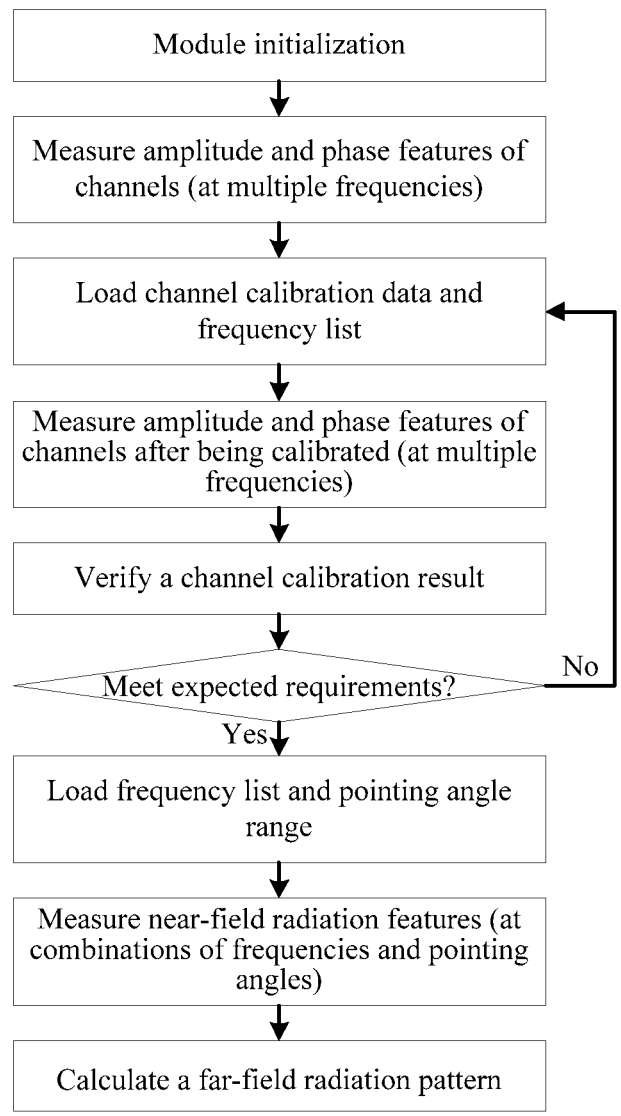
FIG. 3 is a flow chart of a measurement process of a system.

For the system for rapidly calibrating and measuring a phased-array antenna, the transmission measurement process is identical to the reception measurement process, as shown in FIG. 3.

In step 1, modules are initialized.

The upper computer module configures operation parameters of the synchronization control module, the signal source module, the scanning module, the calibration control module, the signal conditioning module, and the vector network module.

In step 2, amplitude and phase features of channels (at multiple frequencies) are measured.

The upper computer module controls the scanning module to sequentially align the scanning probe with a geometric center of each of the channels of the to-be-measured phased-array antenna. After the scanning probe is aligned with a geometric center of a channel, the upper computer module controls the calibration control module to only activate the aligned T/R channel of the to-be-measured phased-array antenna, and set both an attenuation value and a phase shift value to zero. The signal source module, after receiving a pulse synchronization signal from the synchronization control module, changes a frequency of the radio frequency reference signal. The vector network module, after receiving a pulse synchronization signal from the synchronization control module, acquires data and transmits the acquired data to the upper computer module.

In step 3, channel calibration data and a frequency list are loaded.

The upper computer module generates a channel calibration data table based on the amplitude and phase features of the channels at the multiple frequencies, loads the channel calibration data table to the calibration control module, and loads the frequency list to the signal source module and the calibration control module.

In step 4, amplitude and phase features of the channels (at multiple frequencies) after being calibrated are measured.

The upper computer module controls the scanning module to align the scanning probe with a geometric center of each of the channels of the to-be-measured phased-array antenna. After the scanning probe is aligned with a geometric center of a channel, the upper computer module controls the calibration control module to only activate the aligned T/R channel of the to-be-measured phased-array antenna. The calibration control module, after receiving a pulse synchronization signal from the synchronization control module, changes an operation frequency, converts the channel calibration data corresponding to the operation frequency to a beam-control code, and transmits the beam-control code to the to-be-measured phased-array antenna. The signal source module, after receiving a pulse synchronization signal from the synchronization control module, changes a frequency of the radio frequency reference signal. The vector network module, after receiving a pulse synchronization signal from the synchronization control module, acquires data and transmits the acquired data to the upper computer module.

In step 5, a channel calibration result is verified.

The upper computer module groups the channel calibration data based on frequencies. In a case that the amplitude and phase features of the channels at the multiple frequencies meet an expected requirement, proceed to step 6. In a case that the amplitude and phase features of the channels at the multiple frequencies do not meet an expected requirement, proceed to step 3.

In step 6, the frequency list and a pointing angle range are loaded.

The upper computer module loads the frequency list to the signal source module, and loads the frequency list and the pointing angle range to the calibration control module.

In step 7, a near-field radiation feature (at combinations of the frequencies and pointing angles) is measured.

The number of the frequencies is set to M, and the number of the pointing angles is set to N. The calibration control module, after receiving a pulse synchronization signal from the synchronization control module, changes the operation frequency. The calibration control module, after receiving M pulse synchronization signals from the synchronization control module, changes the pointing angle, and sets the operation frequency to an initial value. The calibration control module, after receiving M*N pulse synchronization signals from the synchronization control module, sets the operation frequency to an initial value, and sets the pointing angle to an initial value. The calibration control module calculates the beam-control code in real time based on the operation frequency, the pointing angle, and the channel calibration data, and transmits the beam-control code to the to-be-measured phased-array antenna. The signal source module, after receiving a pulse synchronization signal from the synchronization control module, changes a frequency of the radio frequency reference signal. The vector network module, after receiving a pulse synchronization signal from the synchronization control module, acquires data and transmits the acquired data to the upper computer module. The upper computer module controls the scanning module to move the scanning probe along a predetermined trajectory until the measurement is completed.

In step 8, a far-field radiation pattern is calculated.

The upper computer module divides the acquired data into M*N groups based on the frequencies and the pointing angles, calculates the far-field radiation pattern of the to-be-measured phased-array antenna at different combinations of the frequencies and the pointing angles, and evaluates a pointing accuracy, a beam width, and other indexes of the to-be-measured phased-array antenna.

In the solutions according to the embodiments of the present disclosure, the measurement efficiency can be significantly improved with the system for rapidly calibrating and measuring a phased-array antenna mainly due to the following two reasons.

1. Pulse synchronization is performed to reduce the number of scanning, thereby optimizing the structure of the system and the measurement process.

2. The calibration control module based on FPGA is designed. With the calibration control module, real-time calculation is performed, so that a single loading delay of the beam-control code is controlled to be within 100 us, and the optimized measurement process is implemented in engineering. Hereinafter, the implementation of the calibration control module is described in detail.

System Structure

Figure 4:
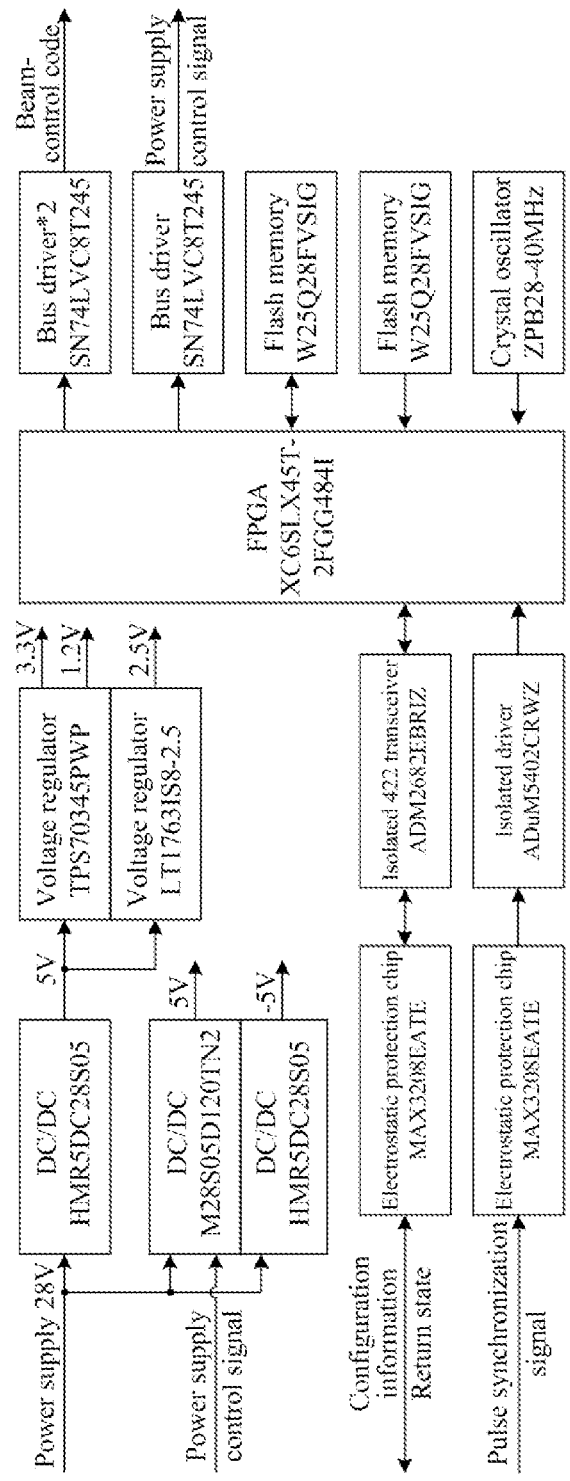
FIG. 4 is a block diagram showing a hardware structure of a calibration control module.

A hardware structure of the calibration control module includes an FPGA circuit, a storage circuit, an isolated RS422 interface circuit, an isolated synchronization interface circuit, a bus driving circuit, and a power supply circuit. The hardware structure is shown in FIG. 4.

As a main control chip, the FPGA is determined based on a spatial dimension, logic, and a storage resource requirement. Considering performance and dimension, the FPGA is determined as Xilinx's XC6SLX45T, which includes 6822 Slices, 58 DSP resources, 2088Kb storage resources and two GTP transceivers, has a static operating current of only 23 mA, and natively supports remote software upgrade based on a Mutiboot technology. In order to facilitate a clock management module (CMT) in the chip generating a 10 MHz clock for the operation of the to-be-measured phased-array antenna, a resonant frequency of a crystal oscillator ZPB28 is determined as 40 MHz. The FPGA adopts SPI Flash serial configuration, and the configured chip is determined as a Winbond's chip of W25Q128FVSIG that has a storage capacity of 128 Mb.

The storage circuit is configured to store the frequency list, the pointing angle range, and channel calibration data at different frequencies. In a case that the to-be-measured phased-array antenna during measurement is powered off due to an accidental situation, loaded parameters are not to be lost. The FPGA reads and writes a storage chip via a QSPI interface, and the storage chip is determined as a Winbond's chip of W25Q128FVSIG that has a storage capacity of 128 Mb.

Via the isolated RS422 interface circuit, the calibration control module receives configuration information from the upper computer module. The isolated RS422 interface circuit is configured to perform level conversion between an RS422 bus and an FPGA IO. An RS485 interface chip is determined as an AD's chip of ADM2682EBRIZ that has a built-in isolated DC-DC for isolating input and output signals from each other. The RS485 interface chip is configured to operate in a full-duplex mode with a maximum transmission rate of 16 Mbps. In order to enhance electrostatic protection, each of an input terminal and an output terminal of ADM2682EBRIZ is provided with a Maxim's chip of MAX3208EATE. Four pairs of switching diodes are arranged in the chip MAX3208EATE, and thus the chip MAX3208EATE can withstand up to an instantaneous voltage of 15 kV.

Via the isolated synchronization interface circuit, the calibration control module receives the pulse synchronization signal. A bus isolation chip is determined as a ADuM5402CRWZ's chip of ADuM5402CRWZ, which has built-in isolated DC/DC for isolating input and output signals from each other and includes two input/output (I/O) channels with a maximum transmission rate of 25 Mbps. In order to enhance the electrostatic protection, each of an input terminal and an output terminal of the chip ADuM5402CRWZ is provided with a Maxim's chip of MAX3208EATE which can withstand up to an instantaneous voltage of 15 kV.

Via an amplitude-phase of the bus driving circuit, the calibration control module transmits the beam-control code to the to-be-measured phased-array antenna. The amplitude-phase of the bus driving circuit is configured to perform level conversion between 3.3V and 5V, improving a driving ability of an output port. The bus driving circuit is implemented by four TI's chips of SN74LVC8T245, which has a maximum transmission rate of 150 Mbps and withstands up to an instantaneous voltage of ±2 kV In order to avoid that the to-be-measured phased-array antenna, after being powered on, operates abnormally due to an uncertain IO state, a power-on enable signal (that is valid at low) and a chip selection signal (that is valid at low) are set to be high by using a pull-up resistor, and a transmission enable signal (that is valid at high) and a reception enable signal (that is valid at high) are set to be high by using a pull-down resistor.

The power supply circuit is configured to isolate the inputted 28V power, convert the 28V power to a 5V power and a-5V power required for the operation of the to-be-measured phased-array antenna, and convert the 28V power to a 5V power, a 1.2 Vpower, a 2.5V power and a 3.3V power required for the operation of the calibration control module. For the 5V power required for the operation of the to-be-measured phased-array antenna, a DC-DC converter is determined as a Zhenhua Micro's chip of M28S05D120TN2, which has an input voltage ranging from 16V to 40V, an output voltage of 5V, a maximum output power of 120 W, and a dimension of 61*25*13 mm. For the −5V power, a DC-DC converter is determined as a Zhuzhou Hongda's chip of HMR5DC28S05, which has an input voltage ranging from 16V to 40V, an output voltage of 5V, a maximum output power of 5 W, and a dimension of 12.7*12.7*10.8 mm. For the 5V power required for the operation of the calibration control module, a DC-DC converter is determined as a Zhuzhou Hongda's chip of HMR5DC28S05. To convert the 5V power to the 1.2V power, the 2.5V power and the 3.3V power required for the operation of different chips, a power conversion chip is determined as a TI's chip of TPS70345 and a LT's chip of LT1763-2.5. TPS70345 has an input voltage ranging from 2.7V to 7V, a rated current of 1 A for 3.3V power, and a rated current of 2 A for 1.2V power, and LT1763-2.5 has an input voltage ranging from 1.8V to 20V, a rated current of 500 mA, meeting the power supply requirements of different chips.

Structure of FPGA Module

Figure 5:
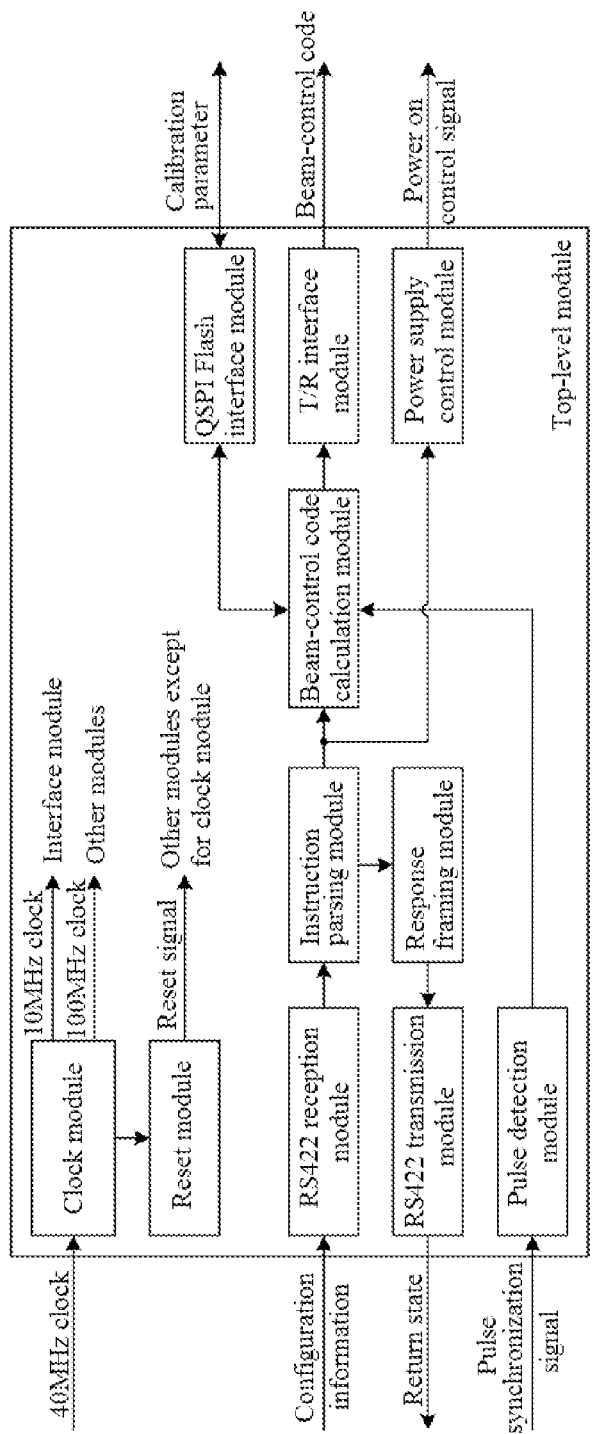
FIG. 5 shows data flows in calibration control FPGA software.

Calibration control FPGA software is designed in a top-down manner. A top-level module is configured to define an external interface of the software, declare and instantiate various functional modules. The top-level module instantiates a clock module, a reset module, an RS422 reception module, an instruction parsing module, a response framing module, an RS422 transmission module, a pulse detection module, a beam-control code calculation module, a QSPI Flash interface module, a T/R interface module, and a power supply control module. FIG. 5 shows data flows in the calibration control FPGA software.

The clock module is implemented by an MMCM IP core provided by Vivado. The clock module is configured to generate a 100 MHz master clock and a 10 MHz interface clock based on a 40 MHz clock inputted by a crystal oscillator.

After the clock is locked, the reset module sets a reset signal to 1 to reset other modules except for the clock module. The reset signal is set to 1 for approximately 167 ms before returning to 0. The reset signal is generated in a 100 MHz clock domain, and a counting threshold for a valid reset signal is $2^{24}$.

The RS422 reception module is configured to parse RS422 bus data, includes two software units of a jitter canceller and a serial port reception controller, and operates in the 100 MHz clock domain. After jitter cancelling is performed on the RS422 bus data, the RS422 bus data is inputted to the serial port reception controller for serial-parallel conversion and verification. In a case that a verification result is correct, a serial-parallel conversion result is assigned to UART reception data. In a case that a verification result is incorrect, E0 is assigned to UART reception data.

The instruction parsing module extracts an instruction, an operation mode, a frequency range, a pointing angle range, and calibration data from the UART receiving data, transmits an instruction parsing state to the response framing module, transmits the operation mode, the frequency range, the pointing angle range, and the calibration data to the beam-control code calculation module, and transmits the instruction to the power supply control module. The instruction includes a T/R power supply turning-on instruction and a T/R power supply turning-off instruction. The operation mode includes a transmission measurement state, a reception measurement state, a channel calibration state, and a radiation pattern measurement state. The frequency range includes the number of frequencies and a frequency sequence number list. The pointing angle range includes an initial value, a step value and the number of an azimuth angle, and an initial value, a step value and the number of a pitch angle. The instruction parsing module operates in the 100 MHz clock domain.

The response framing module is configured to report the instruction parsing state and an FPGA core temperature. The instruction parsing state includes a successful parsing state, a frame format error state, a frame length error state, and a checksum error state. The response framing module reads the FPGA core temperature with an ISE's chip of XADC IP. After a temperature-reading instruction is successfully parsed, UART transmission data is generated based on the FPGA core temperature, and is transmitted to the RS422 transmission module. The response framing module operates in the 100 MHz clock domain.

The RS422 transmission module is configured to generate the RS422 bus data, and includes three software units of a serial port transmission controller, a transmission pulse generator, and a transmission cache. In a case that a cache of the serial port transmission controller is empty, a transmission pulse is 1. In a case that the cache of the serial port transmission controller is not empty, the transmission pulse is 0. The UART transmission data is written in the cache. In a case that the transmission cache is not empty and the transmission pulse is 1, one byte of data is read from the transmission cache and is transmitted to the serial port transmission controller. The RS422 transmission module operates in the 100 MHz clock domain.

The pulse detection module is configured to detect the pulse synchronization signal, and includes one software unit of a jitter canceller. After jitter cancelling is performed on a pulse input signal, in a case that the pulse input signal is changed from 0 to 1 and remains at least 1000 clock cycles (10 us), a valid pulse flag is changed from 0 to 1. The pulse detection module operates in the 100 MHz clock domain.

The QSPI Flash interface module operates in a 10 MHz clock domain, and is configured to control a storage chip to perform erasing, reading, and writing. The QSPI Flash interface module writes the frequency list, the pointing angle range, and the calibration data inputted by the beam-control code calculation module in the storage chip. Upon receiving a reading request from the beam-control code calculation module, the frequency list, the pointing angle range, and the calibration data are read from the storage chip.

In response to an instruction from the instruction parsing module, the power supply control module turns on or turns off a 5V power for the to-be-measured phased-array antenna. The power supply control module operates in the 100 MHz clock domain.

The T/R interface module converts the beam-control code inputted by the beam-control code calculation module to a serial bit stream in a predetermined format, and controls T/R to operate as expected. The T/R interface module operates in the 10 MHz clock domain. It is required to divide the to-be-measured phased-array antenna into four 4*4 sub arrays for configuration in sequence. The serial bit stream for configuring a single 4*4 sub array includes 130 bits. Therefore, a whole array configuration time period is obtained by using the following equation:

$$T_{CFG} = 0.1 * 130 * 4 = 52\ us \quad (3)$$

Figure 6:
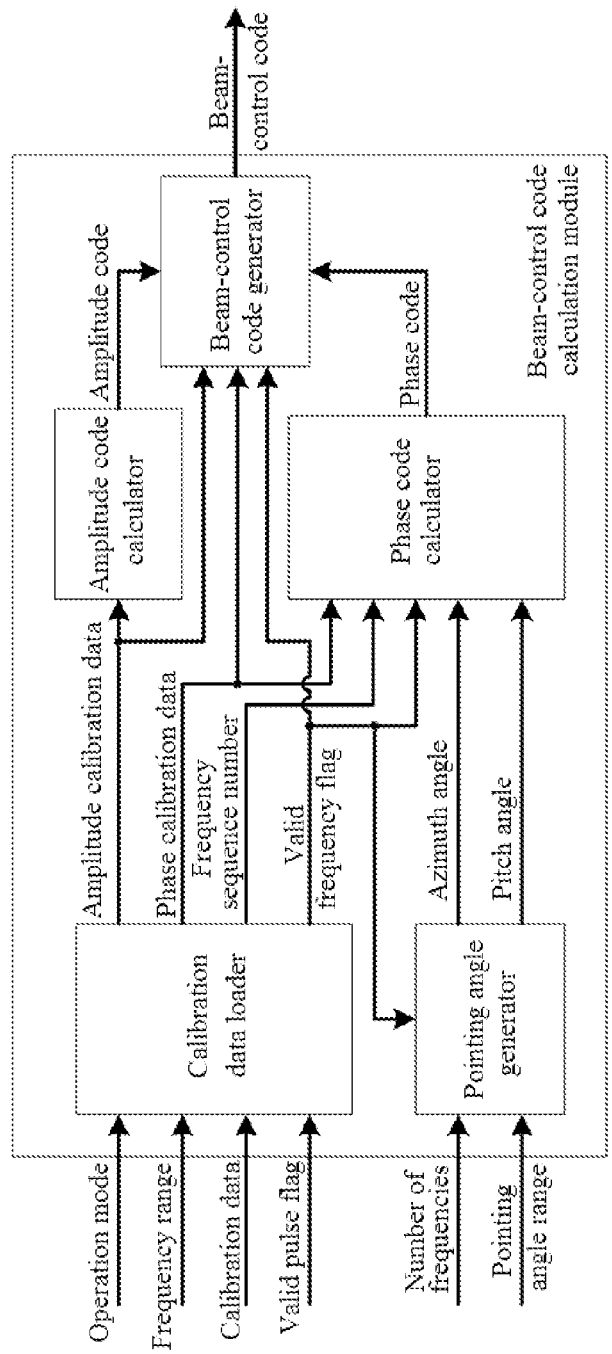
FIG. 6 shows data flows in a beam-control code calculation module.

The beam-control code calculation module is the core of the design of the calibration control FPGA software, and includes five software units: a calibration data loader, a pointing angle generator, an amplitude code calculator, a phase code calculator, and a beam-control code generator. FIG. 6 shows data flows in a beam-control code calculation module.

The calibration data loader includes five dual-port RAMs. The five dual-port RAMs are configured to store a frequency sequence number list, amplitude calibration data and phase calibration data in the transmission measurement state, and calibration data and phase calibration data in the reception measurement state. There is a correspondence relationship between RAM addresses of calibration data and frequency sequence numbers. In a case that a valid pulse flag is equal to 1, the calibration data loader reads calibration data from an address corresponding to a current frequency sequence number, and transmits the calibration data to the amplitude code calculator, the phase code calculator, and the beam-control code generator, and then reads a next frequency sequence number. In a case that a valid pulse flag after being accumulated M times is equal to 1, an RAM address of an RAM for storing the frequency sequence number list is set to zero. Values of the frequency sequence numbers may be non-equidistant, thereby improving the flexibility of measurement.

The pointing angle generator generates all combinations of the azimuth angle and the pitch angle based on the pointing angle range. The pointing angle range includes an initial value, an increment value and the number of the azimuth angle, and an initial value, an increment value and the number of the pitch angle. The pointing angle generator accumulates the initial value of the azimuth angle and accumulates the initial value of the pitch angle, and stores accumulated results in an RAM. In a case that a valid frequency flag after being accumulated M times is equal to 1, a next azimuth angle is read. In a case that a valid frequency flag after being accumulated $M*N_{AZ}$ times is equal to 1, a next pitch angle is read. In a case that a valid frequency flag after being accumulated $M*N_{AZ}*N_{EL}$ times is equal to 1, the azimuth angle is set as the initial value and the pitch angle is set as the initial value.

The amplitude code calculator is implemented based on a lookup table algorithm. Amplitude weighted data of each of the channels is pre-stored in an ROM. The amplitude code calculator adds the amplitude weighted data to the amplitude calibration data to obtain a result, highest 6 bits of the result is determined as an amplitude code.

The phase code calculator is implemented based on real-time calculation. Assuming i and j respectively represent a row number and a column number of a channel of the to-be-measured phased-array antenna, a phase code of a channel at an i-th row and a j-th column is expressed as:

$$C(i, j) = \text{round}\left\{\frac{\text{mod }\{[\delta_{i,j} - (i-1)\alpha - (j-1)\beta], 2\pi\}}{2\pi/2^m}\right\} \quad (4)$$

where round { } represents a rounding operation, $\delta_{i,j}$ represents phase calibration data at the i-th row and the j-th column, m represents the number of bits of a phase shifter of a T/R component, $\alpha$ represents a phase difference of a channel in a azimuth direction, $\beta$ represents a phase difference of the channel in a pitch direction, and $\alpha$ and $\beta$ are expressed as:

$$\alpha = kd \sin \alpha_s \quad (5)$$
$$\beta = kd \cos \alpha_s \sin \varepsilon_s$$

where $k=2\pi/\lambda$, $\lambda$ a represents a wavelength at the operation frequency, d represents a channel interval of the to-bemeasured phased-array antenna, as represents the azimuth angle, and εD represents the pitch angle.

Figure 7:
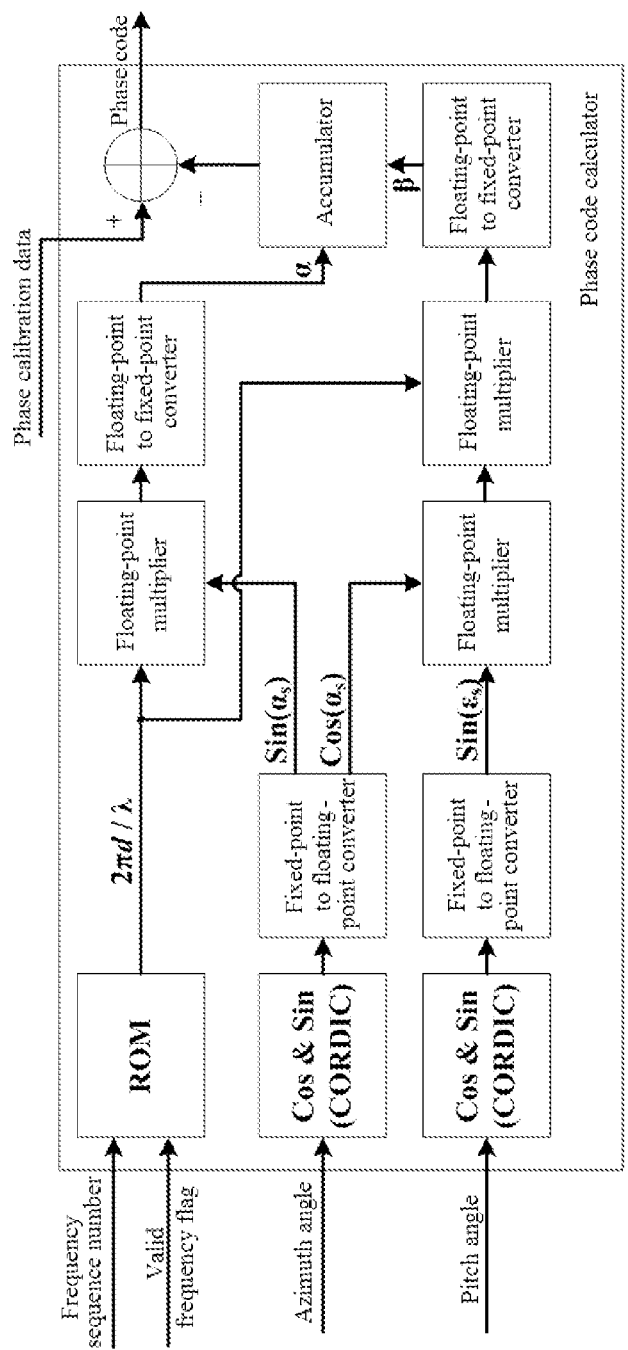
FIG. 7 is a schematic structural diagram of a phase code calculator.

The phase code calculator performs sine and cosine operations by using a CORDIC core, and converts a fixed-point data type to a floating-point data type. Multiplication based on floating-point numbers may significantly reduce errors in determining bits. 2πd/λ corresponding to each of frequencies is stored in the ROM in the floating-point data type. The phase code calculator reads data from the ROM based on a frequency sequence number and multiplies the data with a result of the sine and cosine operations to obtain a product, converts the product into a fixed-point data type, accumulates the product in the fixed-point data type according to the equation (4) to obtain a result, and determines highest 6 bits of the result as the phase code of the channel. FIG. 7 shows a structure of the phase code calculator. With the structure, operational accuracy and real-time performance can be ensured, and resource consumption is reduced.

The beam-control code generator operates in the following three operation modes: a channel feature measurement mode, a channel calibration measurement mode, and a radiation pattern measurement mode. In the channel feature measurement mode, the beam-control code generator generates a beam-control code for turning on or turning off a channel, and the amplitude code and the phase code are set to zero. In the channel calibration measurement mode, the beam-control code generator loads amplitude calibration data and phase calibration data corresponding to a frequency, and generates a beam-control code for turning on or turning off a channel and with a calibration parameter. In the radiation pattern measurement mode, the beam-control code generator loads an amplitude code and a phase code corresponding to a combination of a frequency and a pointing angle, and generates a beam-control code for turning on a whole array.

The beam-control code calculation module may generate an amplitude code and a phase code within 2 us. Since the time period for configuring the whole array is 52 us, the to-be-measured phased-array antenna may perform switching of the frequency and the pointing angle within 100 us.

Real-Time Performance Analysis

Hereinafter, the real-time performance of the system for rapidly calibrating and measuring a phased-array antenna is analyzed. It is assumed that the moving speed v of the scanning probe is 40 mm/s and an acquisition time period $T_{SA}$ of the vector network module is 200 us, the following equation is obtained:

$$N_{PAT} = \frac{\eta \lambda}{2v T_{SA}} \quad (6)$$

where η represents a proportion coefficient, and η=0.8. A center frequency $f_0$ of the to-be-measured phased-array antenna is 12 GHz, and λ=12.5 mm. In a case that a moving distance of the scanning probe is less than ηλ/2, the near-field radiation feature of the to-be-measured phased-array antenna remains unchanged. With the above determined parameters, the maximum number of radiation pattern measurements may be calculated as $N_{PAT}$=1250 based on the equation (6), that is, up to 1250 combinations of frequencies and pointing angles may be measured by performing one round of scanning.

APPLICATION EFFECT

Figure 8:
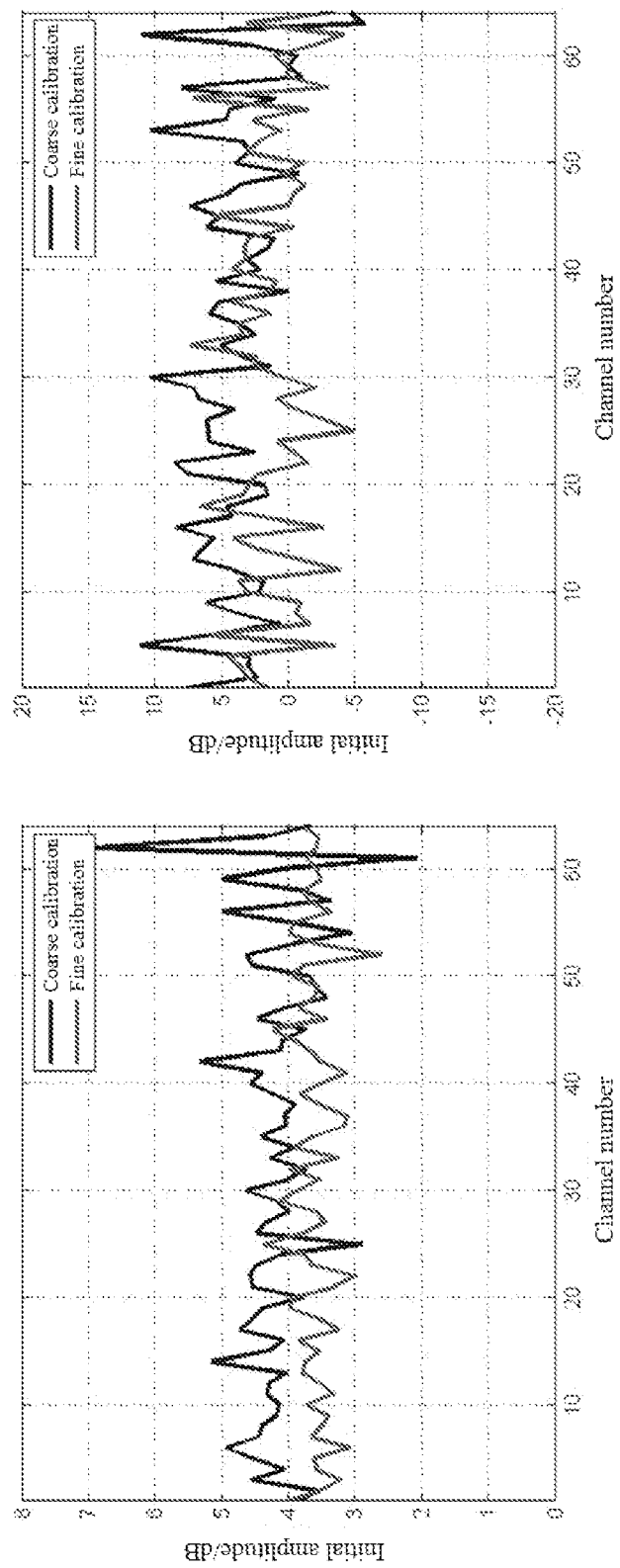
FIG. 8 shows a amplitude and phase calibration result of an 8*8 phased-array antenna.
Figure 9:
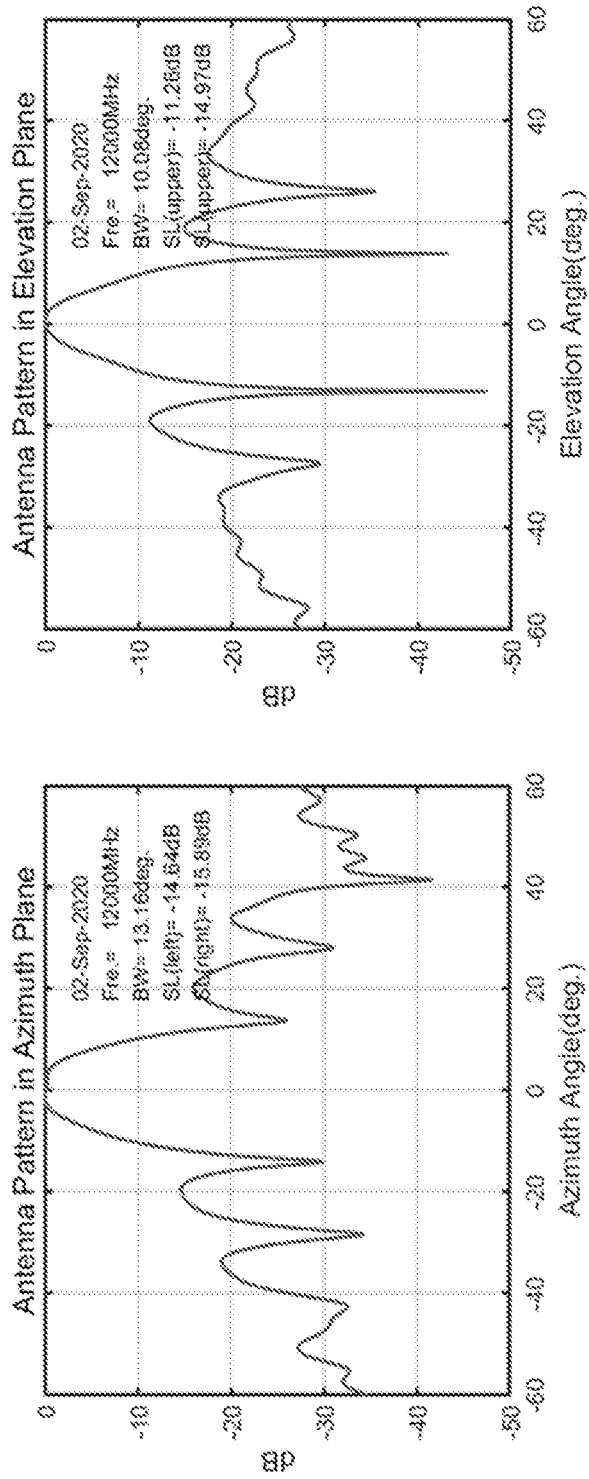
FIG. 9 shows a measured radiation pattern of an 8*8 phased-array antenna.

After performing a first amplitude and phase calibration on a to-be-calibrated phased-array antenna, an amplitude fluctuation is controlled within 5 dB, and a phase deviation is controlled within ±10°. After performing a second amplitude and phase calibration, a mean square deviation of the amplitude ranges from −1 dB to 1 dB, and a mean square deviation of the phase ranges from −5° to 50, as shown in FIG. 8. For the TR component, amplitude modulation accuracy is 0.5 dB and phase shift accuracy is 5.625°. Considering the additional influence of parasitic amplitude and phase on the T/R component, the error introduced by the calibration is basically controlled within a theoretical range. In a case that both the azimuth angle and the pitch angle of the to-be-calibrated phased-array antenna are 0°, a measured radiation pattern is shown in FIG. 9. Key indexes such as a radiation pattern gain, a beam width, and a sidelobe level are identical to an HFSS simulation result, which indicates that the to-be-measured phased-array antenna is correctly designed, and the amplitude calibration data and the phase calibration data are accurate and reliable.

Apparently, those skilled in the art may make various modifications and variations to the present disclosure without departing from the principle of the present disclosure. If these modifications and variations to the present disclosure fall within the scope of the claims and equivalent technologies thereof, these modifications and variations also fall within the protection scope of the present disclosure.

Contents described in detail in the specification of the present disclosure belong to the well-known technology of those skilled in the art.

The invention claimed is:

1. A system for rapidly calibrating and measuring a phased-array antenna, comprising: an upper computer module, a switch module, a synchronization control module, a signal source module, a power amplifier module, a low-noise amplifier module, a to-be-measured phased-array antenna, a power supply module, a calibration control module, a scanning module, a signal conditioning module, and a vector network module, wherein the upper computer module is configured to: transmit configuration information to the calibration control module via a computer interface and receive state information from the calibration control module via the computer interface; and transmit the configuration information to the switch module via an Ethernet interface and receive position information of a scanning probe and acquired data from the switch module;

the switch module is configured to: receive the configuration information from the upper computer module via the Ethernet interface, and transmit the configuration information to each of the signal source module, the synchronization control module, the scanning module, the signal conditioning module and the vector network module via a different Ethernet interface based on different destination addresses; and receive the position information of the scanning probe from the scanning module via the Ethernet interface, receive acquired data from the vector network module via the Ethernet interface, and transmit the position information and the acquired data to the upper computer module via the Ethernet interface;

the synchronization control module is configured to: receive the configuration information from the switch module via the Ethernet interface, generate a pulse synchronization signal, and transmit the pulse synchronization signal to the signal source module, the calibration control module, and the vector network module via a general-purpose input/output (GPIO) interface;

the signal source module is configured to: in a transmission measurement state, receive the configuration information from the switch module via the Ethernet interface, receive the pulse synchronization signal from the synchronization control module via the GPIO interface, and generate a radio frequency reference signal and transmit the radio frequency reference signal to the power amplifier module via a radio frequency coaxial interface; and in a reception measurement state, receive the configuration information from the switch module via the Ethernet interface, receive the pulse synchronization signal from the synchronization control module via the GPIO interface, and generate a radio frequency reference signal and transmit the radio frequency reference signal to the scanning module and the signal conditioning module via a radio frequency coaxial interface;

the power amplifier module is configured to: in the transmission measurement state, receive the radio frequency reference signal from the signal source module via the radio frequency coaxial interface, generate an amplified signal, and transmit the amplified signal to the to-be-measured phased-array antenna and the signal conditioning module via the radio frequency coaxial interface; the power supply module is configured to: supply a 28V power to the calibration control module via a power supply interface;

the calibration control module is configured to: receive the 28V power from the power supply module via the power supply interface, convert the 28V power to a +5V power and a −5V power, output the +5V power and the −5V power to the to-be-measured phased-array antenna via the power supply interface, receive the configuration information from the upper computer module via the computer interface, receive the pulse synchronization signal from the synchronization control module via the GPIO interface, generate a beam-control code after parsing the pulse synchronization signal, transmit the beam-control code to the to-be-measured phased-array antenna via the GPIO interface, and transmit the state information to the upper computer module via the computer interface;

the to-be-measured phased-array antenna is configured to: in the transmission measurement state, receive the amplified signal from the power amplifier module via the radio frequency coaxial interface, receive the beam-control code from the calibration control module via the GPIO interface, generate a radio frequency transmission signal, and transmit the radio frequency transmission signal to the scanning module through electromagnetic wave radiation; and in the reception measurement state, receive a radio frequency transmission signal from the scanning module through electromagnetic wave radiation, receive the beam-control code from the calibration control module via the GPIO interface, generate a radio frequency reception signal, and transmit the radio frequency reception signal to the low-noise amplifier module via the radio frequency coaxial interface;

the low-noise amplifier module is configured to: in the reception measurement state, receive the radio frequency reception signal from the to-be-measured phased-array antenna via the radio frequency coaxial interface, perform amplification and filtering on the radio frequency reception signal to generate an amplified signal, and transmit the amplified signal to the signal conditioning module via the radio frequency coaxial interface;

the scanning module is configured to: receive the configuration information from the switch module via the Ethernet interface, move the scanning probe, and transmit the position information of the scanning probe to the switch module via the Ethernet interface; in the transmission measurement state, receive the radio frequency transmission signal from the to-be-measured phased-array antenna through electromagnetic wave radiation, generate a radio frequency reception signal, and transmit the radio frequency reception signal to the signal conditioning module via the radio frequency coaxial interface; and in the reception measurement state, receive the radio frequency reference signal from the signal source module via the radio frequency coaxial interface, generate the radio frequency transmission signal, and transmit the radio frequency transmission signal to the to-be-measured phased-array antenna through electromagnetic wave radiation;

the signal conditioning module is configured to: in the transmission measurement state, receive the configuration information from the switch module via the Ethernet interface, receive the radio frequency reception signal from the scanning module and the amplified signal from the power amplifier module via the radio frequency coaxial interface, perform down conversion processing on the radio frequency reception signal and the amplified signal to generate a baseband reception signal and a baseband reference signal, and transmit the baseband reception signal and the baseband reference signal to the vector network module via the radio frequency coaxial interface; and in the reception measurement state, receive the configuration information from the switch module via the Ethernet interface, receive the amplified signal from the low-noise amplifier module and the radio frequency reference signal from the signal source module via the radio frequency coaxial interface, perform down conversion processing on the amplified signal and the radio frequency reference signal to generate a baseband reception signal and a baseband reference signal, and transmit the baseband reception signal and the baseband reference signal to the vector network module via the radio frequency coaxial interface; and the vector network module is configured to: receive the configuration information from the switch module via the Ethernet interface, receive the pulse synchronization signal from the synchronization control module via the GPIO interface, receive the baseband reception signal and the baseband reference signal from the signal conditioning module via the radio frequency coaxial interface, calculate an amplitude ratio and a phase difference between the baseband reception signal and the baseband reference signal, and transmit the amplitude ratio and the phase difference to the switch module via the Ethernet interface.

2. The system for rapidly calibrating and measuring a phased-array antenna according to claim 1, wherein the calibration control module comprises a calibration data loader, a pointing angle generator, an amplitude code calculator, a phase code calculator, and a beam-control code generator, wherein:

the calibration data loader comprises five dual-port RAMs for storing a frequency sequence number list, amplitude calibration data and phase calibration data in the transmission measurement state, and amplitude calibration data and phase calibration data in the reception measurement state; there is a correspondence relationship between RAM addresses of calibration data and frequency sequence numbers; the calibration data loader is configured to, in a case that a valid pulse flag is equal to 1, read calibration data from an address corresponding to a current frequency sequence number, transmit the calibration data to the amplitude code calculator, the phase code calculator and the beam-control code generator, and read a next frequency sequence number; and in a case that a valid pulse flag after being accumulated M times is equal to 1, an RAM address of an RAM for storing the frequency sequence number list is set to zero;

the pointing angle generator is configured to: generate all combinations of an azimuth angle and a pitch angle based on a pointing angle range, wherein the pointing angle range comprises an initial value, an increment value and the number of the azimuth angle, and an initial value, an increment value and the number of the pitch angle; accumulate the initial value of the azimuth angle and accumulate the initial value of the pitch angle; store accumulated results in an RAM; in a case that a valid frequency flag after being accumulated M times is equal to 1, read a next azimuth angle; in a case that a valid frequency flag after being accumulated $M*N_{AZ}$ times is equal to 1, read a next pitch angle; and in a case that a valid frequency flag after being accumulated $M*N_{AZ}*N_{EL}$ times is equal to 1, set the azimuth angle as the initial value and set the pitch angle as the initial value;

the amplitude code calculator is configured to add amplitude weighted data of each of channels pre-stored in an ROM to the amplitude calibration data to obtain a result, and determine highest 6 bits of the result as an amplitude code;

the phase code calculator is configured to calculate a phase code based on the phase calibration data, the azimuth angle, the pitch angle, and the frequency sequence numbers; and the beam-control code generator is configured to perform channel feature measurement, channel calibration measurement, and radiation pattern measurement; wherein the beam-control code generator is configured to, in a case of performing the channel feature measurement, generate a beam-control code for turning on or turning off a channel, and the amplitude code and the phase code are set to zero; in a case of performing the channel calibration measurement, load amplitude calibration data and phase calibration data corresponding to a frequency, and generate a beam-control code with a calibration parameter and for turning on or turning off a channel; and in a case of performing the radiation pattern measurement, load an amplitude code and a phase code corresponding to a combination of a frequency and a pointing angle, and generate a beam-control code for turning on a array.

3. The system for rapidly calibrating and measuring a phased-array antenna according to claim 2, wherein the phase code is calculated by using the following equation:

$$C(i, j) = \text{round}\left\{\frac{\text{mod}\{[\delta_{i,j} - (i-1)\alpha - (j-1)\beta], 2\pi\}}{2\pi/2^m}\right\}$$

where i and j respectively represent a row number and a column number of a channel of the to-be-measured phased-array antenna, C(i, j) represents a phase code of a channel at an i-th row and a j-th column, round { } represents a rounding operation, $\delta_{i,j}$ represents phase calibration data at the i-th row and the j-th column, m represents the number of bits of a phase shifter of a T/R component, α represents a phase difference of a channel in a azimuth direction, β represents a phase difference of the channel in a pitch direction, and a and β are expressed as:

$$\alpha = kd\sin\alpha_s$$
$$\beta = kd\cos\alpha_s\sin\varepsilon_s$$

where k=2π/λ, λ represents a wavelength at an operation frequency, d represents a channel interval of the to-be-measured phased-array antenna, αs represents the azimuth angle, and εs represents the pitch angle.

4. The system for rapidly calibrating and measuring a phased-array antenna according to claim 2, wherein the phase code calculator is configured to:

perform sine and cosine operations by using a CORDIC core, convert a fixed-point data type to a floating-point data type, store 2πd/λ corresponding to each of frequencies in the ROM in the floating-point data type; read data from the ROM based on a frequency sequence number and multiply the data with a result of the sine and cosine operations to obtain a product, convert the product into a fixed-point data type, accumulate the product in the fixed-point data type to obtain a result, and determine highest 6 bits of the result as the phase code of the channel.

5. A method for rapidly calibrating and measuring a phased-array antenna, applied to the system for rapidly calibrating and measuring a phased-array antenna according to claim 1, and comprising:

step 1, configuring, by the upper computer module, operation parameters of the synchronization control module, the signal source module, the scanning module, the calibration control module, the signal conditioning module, and the vector network module, and generating, by the upper computer module, a to-be-measured frequency list;

step 2, measuring amplitude and phase features of channels of the phased-array antenna at a plurality of frequencies, and obtaining channel calibration data;

step 3, loading, by the upper computer module, the frequency list and the channel calibration data to the phased-array antenna;

step 4, measuring amplitude and phase features of the channels after being calibrated of the phased-array antenna at the plurality of frequencies, and obtaining a calibration result of the amplitude and phase features of the channels after being calibrated of the phased-array antenna at the plurality of frequencies;

step 5, verifying the calibration result of the amplitude and phase features of the channels after being calibrated of the phased-array antenna at the plurality of frequencies; proceeding to step 6 in a case that the calibration result meets an expected requirement; and proceeding to step 3 in a case that the calibration result does not meet an expected requirement;

step 6, loading, by the upper computer module, the frequency list and a pointing angle range to the phased-array antenna;

step 7, measuring a near-field radiation feature of the phased-array antenna at combinations of the frequencies and pointing angles; and step 8, calculating a far-field radiation pattern based on the near-field radiation feature, and evaluating indexes of the to-be-measured phased-array antenna based on the far-field radiation pattern.

6. The method for rapidly calibrating and measuring a phased-array antenna according to claim 5, wherein the step 2 further comprises:

controlling, by the upper computer module, the scanning module to sequentially align the scanning probe with a geometric center of each of the channels of the to-be-measured phased-array antenna;

after the scanning probe is aligned with a geometric center of a channel, controlling, by the upper computer module, the calibration control module to only activate the channel of the to-be-measured phased-array antenna, and setting, by the upper computer module, an attenuation value and a phase shift value to zero;

changing, by the signal source module after receiving a pulse synchronization signal from the synchronization control module, a frequency of the radio frequency reference signal; and acquiring, by the vector network module after receiving a pulse synchronization signal from the synchronization control module, data, and transmitting, by the vector network module, the acquired data to the upper computer module.

7. The method for rapidly calibrating and measuring a phased-array antenna according to claim 5, wherein the step 3 further comprises:

generating, by the upper computer module, a channel calibration data table based on the amplitude and phase features of the channels of the phased-array antenna at the plurality of frequencies, loading, by the upper computer module, the channel calibration data table to the calibration control module, and loading, by the upper computer module, the frequency list to the signal source module and the calibration control module.

8. The method for rapidly calibrating and measuring a phased-array antenna according to claim 5, wherein the step 4 further comprises:

controlling, by the upper computer module, the scanning module to sequentially align the scanning probe with a geometric center of each of the channels of the to-be-measured phased-array antenna;

after the scanning probe is aligned with a geometric center of a channel, controlling, by the upper computer module, the calibration control module to only activate the channel of the to-be-measured phased-array antenna;

changing, by the calibration control module after receiving a pulse synchronization signal from the synchronization control module, an operation frequency, converting, by the calibration control module, channel calibration data corresponding to the operation frequency to a beam-control code, and transmitting, by the calibration control module, the beam-control code to the to-be-measured phased-array antenna; changing, by the signal source module after receiving a pulse synchronization signal from the synchronization control module, a frequency of the radio frequency reference signal; and acquiring, by the vector network module after receiving a pulse synchronization signal from the synchronization control module, data, and transmitting, by the vector network module, the acquired data to the upper computer module.

9. The method for rapidly calibrating and measuring a phased-array antenna according to claim 5, wherein the step 7 further comprises:

changing, by the calibration control module after receiving a pulse synchronization signal from the synchronization control module, an operation frequency; changing, by the calibration control module after receiving M pulse synchronization signals from the synchronization control module, the pointing angle, and setting, by the calibration control module, the operation frequency to an initial value; and setting, by the calibration control module after receiving M*N pulse synchronization signals from the synchronization control module, the operation frequency to an initial value, and setting, by the calibration control module, the pointing angle to an initial value; wherein M represents the number of the frequencies, and N represents the number of the pointing angles;

calculating, by the calibration control module, the beam-control code in real time based on the operation frequency, the pointing angle, and the channel calibration data, and transmitting, by the calibration control module, the beam-control code to the to-be-measured phased-array antenna; changing, by the signal source module after receiving a pulse synchronization signal from the synchronization control module, a frequency of the radio frequency reference signal; and acquiring, by the vector network module after receiving a pulse synchronization signal from the synchronization control module, data, and transmitting, by the vector network module, the acquired data to the upper computer module; and controlling, by the upper computer module, the scanning module to move the scanning probe along a predetermined trajectory until the measurement is completed.

10. The method for rapidly calibrating and measuring a phased-array antenna according to claim 5, wherein the step 8 further comprises:

dividing, by the upper computer module, the acquired data into M*N groups based on the frequencies and the pointing angles, calculating, by the upper computer module, the far-field radiation pattern of the to-be-measured phased-array antenna at different combinations of the frequencies and the pointing angles, and evaluating, by the upper computer module, the indexes of the to-be-measured phased-array antenna, wherein M represents the number of the frequencies and N represents the number of the pointing angles.

11. The method of claim 1, wherein the computer interface comprises a digital data transmission interface.

12. The method of claim 11, wherein the digital data transmission interface comprises a serial digital data transmission interface.

* * * * *